C. A. DIES.
MECHANISM FOR PIPE CUTTING.
APPLICATION FILED DEC. 16, 1912.
1,205,125.
Patented Nov. 14, 1916.
2 SHEETS—SHEET 2.
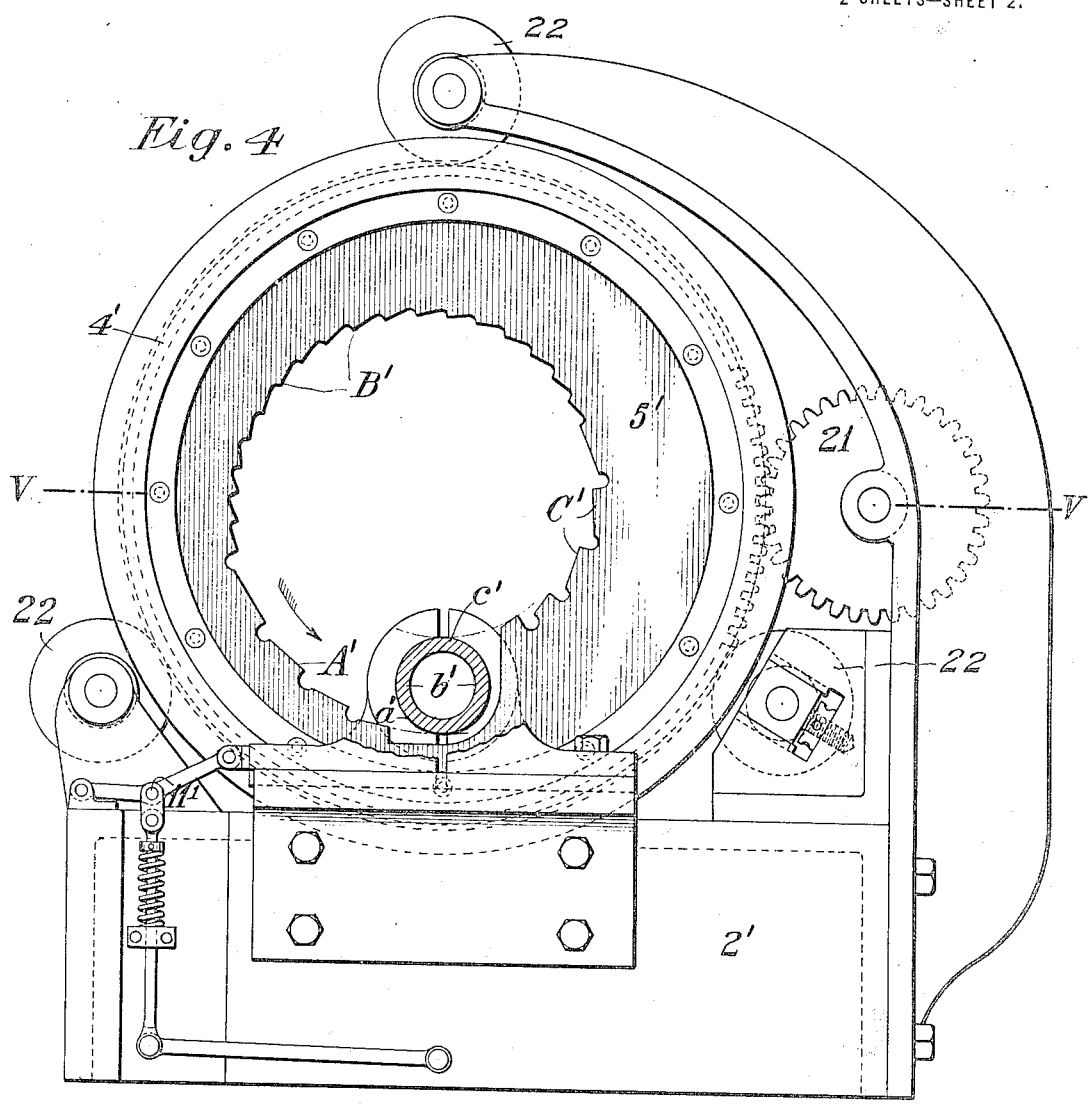
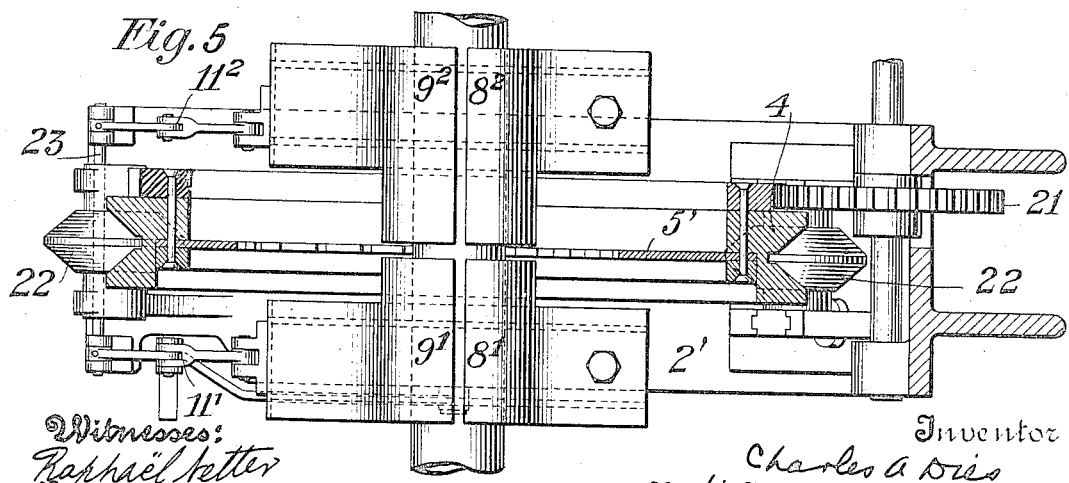

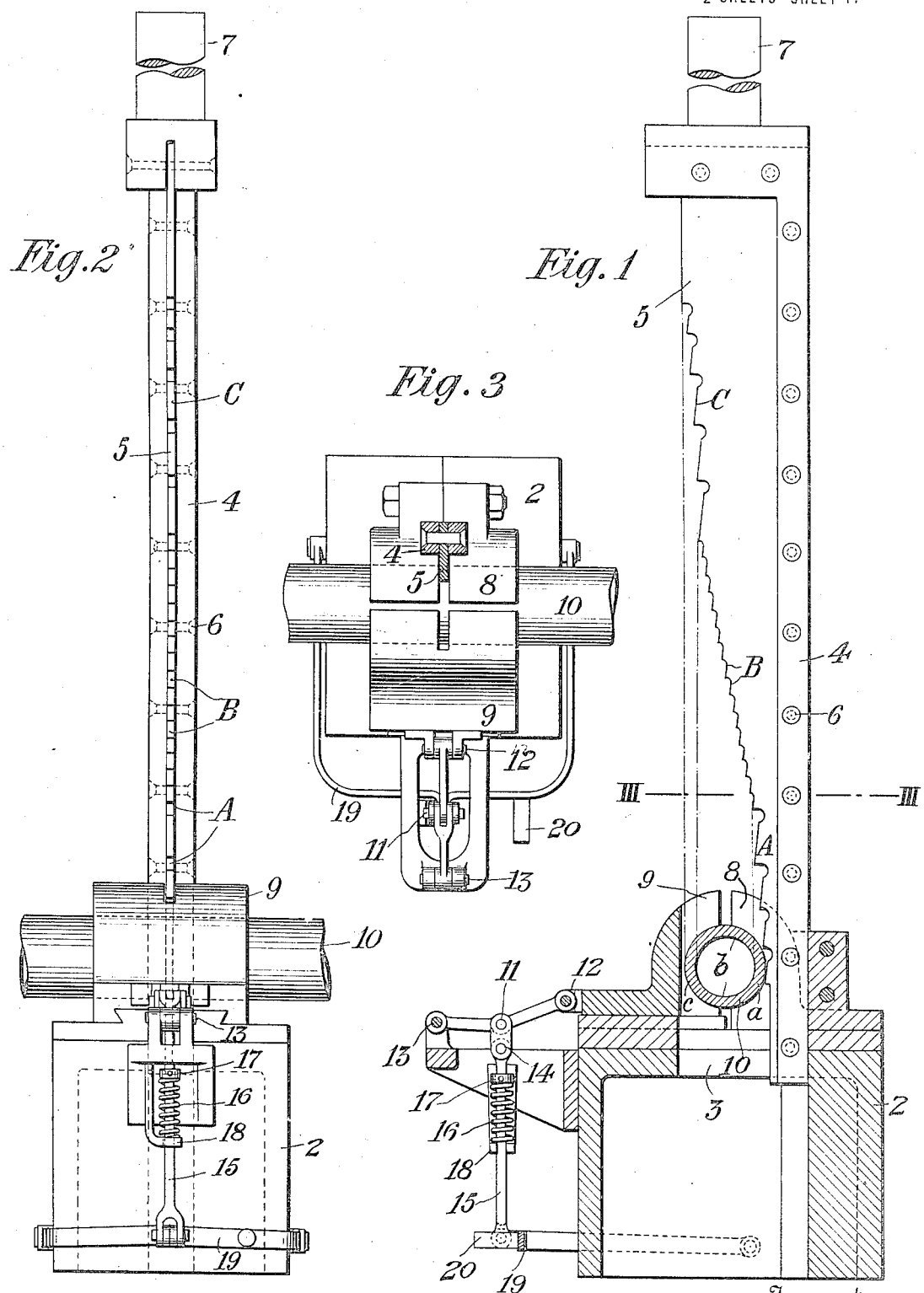

UNITED STATES PATENT OFFICE.

CHARLES ALBERT DIES, OF CHICAGO, ILLINOIS, ASSIGNOR TO MARK MANUFACTURING COMPANY, OF CHICAGO, ILLINOIS, A COPARTNERSHIP COMPRISED OF CLAYTON MARK, ANSON MARK, AND CYRUS MARK.

MECHANISM FOR PIPE-CUTTING.

1,205,125.  Specification of Letters Patent.  Patented Nov. 14, 1916.

Application filed December 16, 1912. Serial No. 736,898.

*To all whom it may concern:*

Be it known that I, CHARLES A. DIES, a citizen of the United States, residing at Chicago, Cook county, Illinois, have invented a new and Improved Mechanism for Pipe-Cutting, of which the following is a specification, reference being had to the accompanying drawings, in which—

Figure 1 is a side elevation of my cutting mechanism partly in section; Fig. 2 is an end elevation thereof; Fig. 3 is a section on lines III—III of Fig. 1; Fig. 4 shows in elevation a modified form of my device and Fig. 5 is a section on lines V—V of Fig. 4.

My invention relates to mechanism for cutting pipe and is especially designed to shear the pipe without the use of internal supporting means.

Referring to the drawings, 2 is the base suitably apertured at 3 for the reciprocating holder 4 and the saw 5 which is secured in the holder 4 by any suitable means such as the rivets 6. The holder 4 is carried and actuated by the shank 7 which is adapted to be mounted in any suitable manner and to be reciprocated by any suitable means.

The pipe gripping means is preferably comprised of a fixed jaw 8 which is bolted to the base 2 and of a movable jaw 9, and these jaws are suitably slotted to permit the passage of the holder 4 and saw 5 therethrough.

10 is a pipe in position to be operated on.

The movable jaw 9 is adapted to be moved away from the jaw 8 by the toggle 11. The toggle 11 is pivoted at 12 to the jaw 9 and to the base at 13, and at 14 to the bar 15. The bar 15 has a spring 16 positioned thereon which is held in tension by the collar 17 which is fastened to the bar 15, and by the arm 18 which is mounted on the base 2.

19 is a strap pivoted at its ends to the base 2 and to the bar 15. The strap 19 may be actuated by any suitable means, such as the foot treadle 20, and by it and through the bar 15 and toggle 11, the jaw 9 is retracted to free the pipe after its shearing or cutting operation and to permit the insertion of another pipe.

It is to be noted that the saw teeth A and C which are near the ends of the saw are arranged to do a greater amount of work than the teeth B toward the middle part of the saw, and this is because there is a much greater thickness of metal to be sheared through at any given point in the parts marked $a$ and $c$ than there is in the parts marked $b$.

The operation of my device is as follows: I insert by any suitable means the pipe to be sheared between the jaws 8 and 9, the jaw 9 being retracted to permit such insertion, and by releasing the foot treadle 20 the jaw 9 is forced against the pipe, by means of the tension on the spring 16, so as to hold it in position to be operated upon. I then actuate the shaft 7 and the saw is moved downward to shear the pipe. The large teeth A shear through the thick part of the pipe marked $a$, and small teeth B through the thin parts of the pipe marked $b$ and the large teeth C through the part of the pipe marked $c$, and the arrangement of the teeth is such that the pipe will be cut through cleanly without leaving any bur or bead on either the interior or the exterior of the cut sections of the pipe.

In Figs. 4 and 5 I show a modified form of my cutting mechanism in which the saw 5' is circular in form, and is mounted in the rotary frame or holder 4' which is driven by the gear wheel 21 and is supported by the idlers 22 carried by the base 2'. The saw 5' travels in the direction of the arrow and the teeth A' cut through the thick section $a'$, the teeth B' through the thin sections $b'$, and the teeth C' through thick sections $c'$ in substantially the same manner as described above. In this modification the pipe gripping means are comprised of the fixed jaws 8' $8^2$, on each side of the saw 5' and of the movable jaws 9' $9^2$ also located on opposite sides of the saw 5'. The jaws 9' and $9^2$ are actuated through the jointed lever $11^2$, the shaft 23 and the toggle 11'. The lever $11^2$ and the toggle 11' are secured to the shaft 23 which is rotatably mounted on the base 2'. The remainder of the operating mechanism is identical with that shown in Figs. 1, 2 and 3.

I have found that when I shear pipe with the device which I have described and shown herein, that no internal supporting mandrel, or other like means, is necessary, and that my improved saw leaves the edges of the pipe clean cut without any bead or rough edges either internally or externally.

Many changes may be made in the construction and operation of the mechanism described and shown herein without departing from my invention.

What I claim is:

1. A pipe cutting mechanism having gripping means for the pipe, a saw blade having differentially arranged groups of teeth thereon, one of said groups being adapted to shear through the metal of the pipe in its greatest dimension in cross section, another of said groups being adapted to shear through the metal of the pipe in its least dimension in cross section and a third of said groups being adapted to shear through the remaining metal in a dimension which is at least as great as that of the metal sheared by the first group of teeth, the said saw blade comprising means for cutting the pipe in one continuous stroke.

2. In a pipe cutting mechanism means for supporting the pipe externally and a saw having differentially arranged sets of teeth, the coarser teeth being adapted to cut through the metal of the pipe at its greatest section, and the teeth of the smaller sets being adapted to cut through the metal in its least sections, said teeth being of a size directly proportioned to the amount of work to be done by the teeth in cutting through the pipe.

3. In a pipe cutting mechanism, a base, a saw mounted on said base and adapted for cutting through a pipe, said saw being adapted to cut through a pipe at a single stroke by a plurality of series of teeth, each series being adapted to remove a predetermined amount of metal, and means for externally supporting an internally unsupported pipe on said base, comprising pipe-gripping jaws, one of said jaws being fixed to said base and the other of said jaws being adapted to be moved toward and away from said pipe for releasing and gripping the same.

CHARLES ALBERT DIES.

Witnesses:
 CLARENCE MARK,
 JOHN K. SAVILLE.